United States Patent

Sparks

Patent Number: 5,908,325

Date of Patent: *Jun. 1, 1999

[54] SUPPORT FOR DIRECT CONNECT DISK DRIVES

[75] Inventor: Casey L. Sparks, Fort Collins, Colo.

[73] Assignee: LSI Logic Corporation, Milpitas, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/721,078

[22] Filed: Sep. 26, 1996

[51] Int. Cl.$^6$ .................................................. H01R 9/09
[52] U.S. Cl. ......................... 439/296; 439/76.1; 439/529
[58] Field of Search .................. 439/76.1, 374, 439/296, 529

[56] References Cited

U.S. PATENT DOCUMENTS

| | | |
|---|---|---|
| 2,832,013 | 4/1958 | Pedersen et al. . |
| 3,522,485 | 8/1970 | De Metrick . |
| 3,662,224 | 5/1972 | Rauch . |
| 3,775,643 | 11/1973 | Schachnow et al. . |
| 4,089,042 | 5/1978 | Torburn .................................. 361/412 |
| 4,875,140 | 10/1989 | Delpech et al. ...................... 361/412 |

*Primary Examiner*—Gary Paumen
*Attorney, Agent, or Firm*—David K. Lucente

[57] ABSTRACT

The present invention includes an apparatus for supporting a device in a computer comprising a base, preferably juxtaposed to a connector, and a ledge extending from the base section. The base preferably defines a channel to fit the apparatus to the connector. The channel can be defined by arms that are included in the base. At least one support strut extends between the base and the ledge. A disk drive is supported by the apparatus. The disk drive is seated against the ledge to provide support and to attenuate vibrations caused by the rotating disk. Preferably, the apparatus is seated against a motherboard so that the connector does not bear the weight of the disk drive. One modification of the present invention integrates the connector and the apparatus.

33 Claims, 2 Drawing Sheets

5,908,325

SUPPORT FOR DIRECT CONNECT DISK DRIVES

FIELD OF THE INVENTION

The present invention relates to a support for peripherals in a computer and more particularly to a support for a hard disk assembly that is directly coupled to a computer bus.

BACKGROUND OF THE INVENTION

As computers evolve, the speed of the Central Processing Unit (CPU) is increasing. Main memory associated with the CPU, sometimes referred to as Random Access Memory (RAM), has been architecturally changed to complement the increased CPU speed. The RAM has the advantage that it typically resides on the same printed circuit board (motherboard) as the CPU. Thus, interconnection between the CPU and RAM is not a limiting factor in achieving higher processing speeds.

An input/output (I/O) device, such as hard disk drive, usually are coupled to the motherboard through a bus system, a bridge circuit and cabling. The CPU and RAM are coupled to the bus system through another bridge circuit. Thus, the CPU or RAM must communicate with the I/O device through both bridges, the bus system and the cabling, naturally introducing a time delay in the communication.

One method of reducing the communication time delay is to couple the I/O device to the bus system with the least amount of hardware. One proposed technique has the I/O device coupled directly to the bus system, thereby eliminating at least the cabling. This "tightly-coupled" architecture reduces the communication time delay between the motherboard and the I/O device. With the increasing size of application programs and disk drive capacity, tightly coupling the I/O device to the bus system is an inexpensive alternative for providing increased processing speed.

Another method of reducing the communication time delay is to use a PCI (Peripheral Component Interconnect) Local Bus for the bus system. The PCI Local Bus is a known high performance 32- or 64-bit bus with multiplexed address and data lines. It is intended for use as an interconnect mechanism between highly integrated peripheral controller components, peripheral add-in boards, and processor/memory systems.

One limitation of the PCI Local Bus is that no more than ten electrical loads can be coupled thereto. Typical PCI Local Bus configurations are limited to six loads on the motherboard and two expansion connectors or slots, or two loads on the motherboard and four expansion connectors wherein each connector or slot on the PCI Local Bus is considered as one electrical load, and each device that is plugged into a connector is considered as an additional electrical load.

In addition, the actual stub or speedway length of the PCI Local Bus is limited to approximately five inches for bus operations at 33 MHz. In practical terms, present PCI-based implementations are thus limited to plug-in or expansion boards with usually no more than three or four boards per bus. This constraint is a function of the relatively fast clock frequency (up to 33 MHz or 66 MHz), fast-edge drivers and a low current rating of the output drivers.

However, many common peripheral I/O devices, such as CD-ROM, tape drives, floppy drives and hard disk drives, are not conveniently plugged into motherboard slots because the size and weight, and mounting and configuration requirements of the devices. Consequently, tightly coupled architecture is particularly applicable to PCI Local Bus system, yet the practical aspects of the implementation are not overcome.

One disadvantage of this architecture is that a disk drive will rock in a bus slot as the disk rotates. This rocking can weaken or break electrical contact between the traces of the disk drive and the slot. Eventually, communication with the disk drive will be error prone.

Another disadvantage of this architecture is that the weight of the disk drive, which is relatively heavy to other boards that are connected to the bus system, may damage the expansion slot. This problem is worsened when the rocking occurs.

Therefore, an need exists for a support for a hard drive assembly coupled to an internal slot of a computer. Such a support will enable a hard disk drive to be tightly coupled to a bus system slot while maintaining proper electrical contact.

SUMMARY OF THE INVENTION

The present invention includes an apparatus for supporting a device in a computer comprising a base, preferably juxtaposed to a connector, and a ledge extending from the base section. The base preferably defines a channel to fit the apparatus to the connector. The channel can be defined by arms that are included in the base. At least one support strut extends between the base and the ledge.

A disk drive is supported by the apparatus. The disk drive is seated against the ledge to provide support and to attenuate vibrations caused by the rotating disk. Preferably, the apparatus is seated against a motherboard so that the connector does not bear the weight of the disk drive. One modification of the present invention integrates the connector and the apparatus.

The present invention also includes a method of providing support for a device in a computer comprising the steps of positioning a base along a connector, providing a ledge extending from the base and supporting the device with the ledge. The positioning can include adjoining the base to the connector or encompassing the connector with the base. The positioning utilizing a channel to fit the base to the connector.

Numerous other advantages and features of the present invention will become readily apparent from the following detailed description of the invention and the embodiments thereof, from the claims and from the accompanying drawings in which details of the invention are fully and completely disclosed as a part of this specification.

DETAILED DESCRIPTION OF THE PREFERRED EMBODIMENTS

Figure 1:
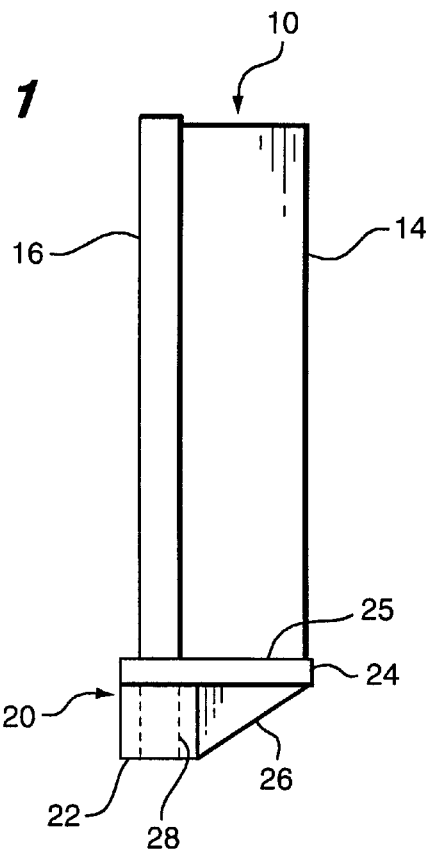
FIG. 1 is a transverse side plan view of a support according to a first embodiment of the present invention.

While this invention is susceptible of embodiment in many different forms, there is shown in the drawings and will be described herein in detail specific embodiments thereof with the understanding that the present disclosure is to be considered as an exemplification of the principles of the invention and is not to be limited to the specific embodiments described.

FIG. 1 illustrates a disk drive assembly 10 supported by a support 20 according to the present invention. Disk drive assembly 10 includes a head disk assembly 14 and a printed circuit board 16. Support 20 includes a base 22, a ledge 24 and struts 26. Ledge 24 defines a supporting surface 25. Preferably, ledge 24 orthogonally extends from base 22.

Base 22 preferably defines a channel 28 (shown in phantom). A connector or slot (not shown) that provides electrical connection to a computer bus system is disposed within channel 28. One such connector is a Peripheral Component Interconnect (PCI) connector slot.

Figure 2:
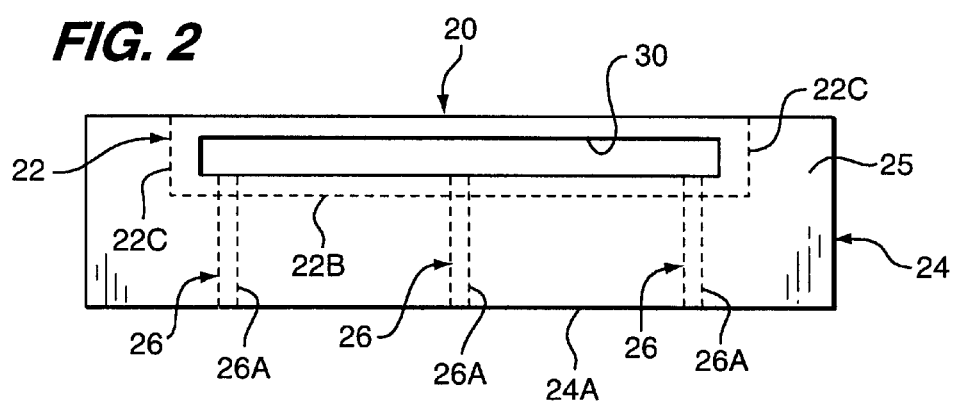
FIG. 2 is a top plan view of the FIG. 1 embodiment.

FIG. 2 illustrates support 20 without disk drive assembly 10 from a top plan view. Support 20 preferably defines a slot 30 that is in communication with channel 28. Electrical contacts (not shown) on printed circuit board 16 protrude through slot 30 and engage the connector or slot that is disposed within channel 28. As shown in FIG. 2, support surface 24 preferably extends beyond supporting surface peripheral sides 22a, 22b and 22c. Sides 26a of struts 26 preferably extend from peripheral side 22b to edge 24a of ledge 24. It is preferred that the length of edge 24a is greater than or equal to the corresponding dimension of the disk drive.

Figure 3:
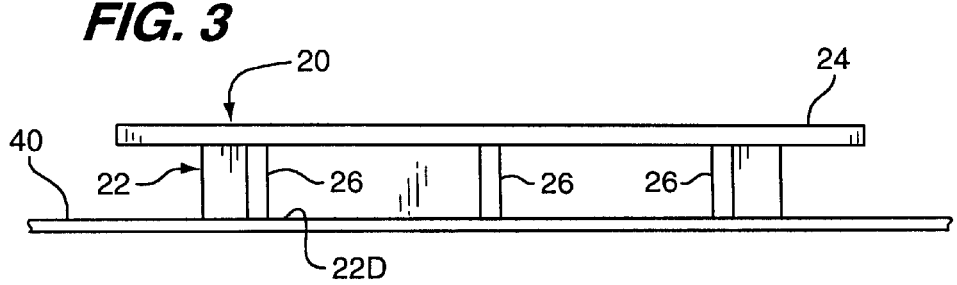
FIG. 3 is a longitudinal side view of the FIG. 1 embodiment.

FIG. 3 shows support 20 resting on a surface 40 that may be part of a computer motherboard. Struts 26 preferably extend between ledge 24 and a bottom edge 22d of base 22.

Figure 4:
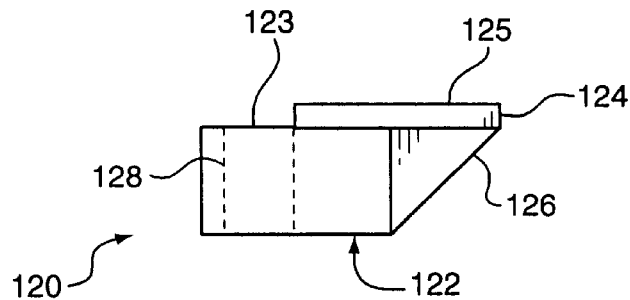
FIG. 4 is a transverse side plan view of a support according to another embodiment of the present invention.

Another embodiment according to the present invention will be described with reference to FIGS. 4 and 5. Turning to FIG. 4, a support 120 includes a ledge 124 that defines a supporting surface 125. Ledge 124 preferably extends from a base 122. Base 122 includes arms 123 which define a channel 128 (shown in phantom). Disposed between base 122 and ledge 124 is at least one strut 126.

Figure 5:
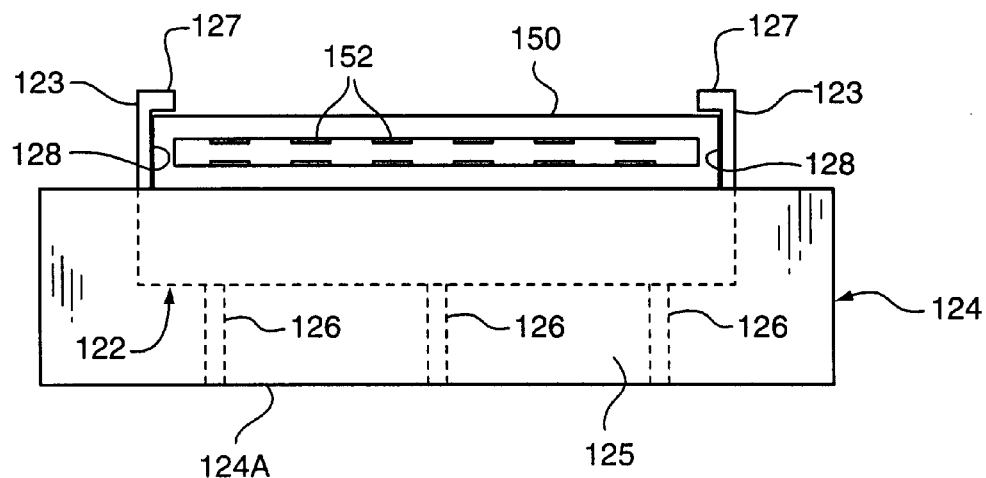
FIG. 5 is a top plan view of the FIG. 4 embodiment.

FIG. 5 illustrates support 120 from a top plan view. Arms 123 of base 122 each have a lip 127. Arms 123 and lips 127 preferably define channel 128 in which connector 150 is disposed. Electrical contacts on a printed circuit board (not shown) protrude into channel 128 and engage electrical contacts 152 of connector 150. As shown in FIG. 5, ledge 124 preferably extends beyond base 122 (shown in phantom). Struts 126 preferably extend between base 122 and edge 124a of ledge 124.

It is preferred that supports 20, 120 use the computer connector or slot as a lateral support or anchor. To this end, channel 28 of support 20 encompasses the connector or slot whereas channel 128 of support 120 provides an adjoining relationship between the connector or slot and support 120. Channels 28, 128 fit respective supports 20, 120 to the connector or slot.

Figure 6:
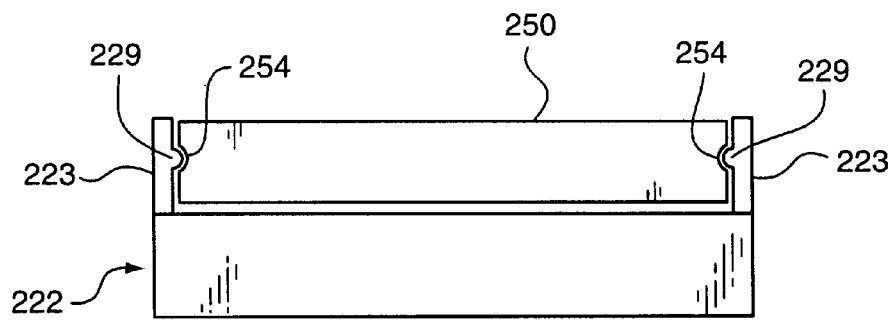
FIG. 6 is a modification to the embodiment of FIG. 4.

Other fittings may be used to fit supports 20, 120 to the connector or slot to provide for lateral support or anchoring. For example, FIG. 6 illustrates a modification to the second embodiment. Support 222 includes arms 223 that have nubs 229. Connector or slot 250 defines flutes 254. Nubs 229 engage flutes 254 to provide a snap fit to connector or slot 250.

If desired, supports 20, 120 can be used to support the entire weight of the disk drive. As such, channel 28 of support 20 is so dimensioned that ledge 24 is not seated against the connector or slot. Note that channels 28 and 128 juxtapose supports 20, 120 to the connector or slot. It may also be desired to integrate the connector or slot with support 20 or 120.

The present invention aids in mounting the disk drive to the connector or slot. Furthermore, the present invention aids in attenuating vibrations caused by the rotating medium in the disk drive. This attenuation will aid in maintaining the disk drive electrically engaged with the connector or slot.

I claim:

1. In combination with a direct drive device including a printed circuit board and a head disk assembly coupled to the printed circuit board, an apparatus for supporting the direct drive device comprising:

a base portion having an electrical connector engaged with the printed circuit board; and a ledge on which the assembly rests, the ledge connected to the base and extending in a substantially horizontal direction from the base.

2. The apparatus of claim wherein said basic portion is juxtaposable to the connector.

3. The apparatus of claim 2 wherein said base portion defines a channel in which the printed circuit board is received and in which the printed circuit board is retained in engagement with the connector.

4. The apparatus of claim 1 wherein said ledge extends orthogonally from said base.

5. The apparatus of claim 1 further comprising at least one support strut extending between said base and said ledge.

6. The apparatus of claim 2 wherein the connector is a bus connector.

7. The apparatus of claim 2 wherein the connector is a PCI connector.

8. The apparatus of claim 1 wherein said base includes arms.

9. The apparatus of claim 8 wherein the arms include lips.

10. The apparatus of claim 8 wherein the arms includes nubs.

11. The apparatus of claim 10 wherein the arms provide a snap-fit to the connector.

12. The apparatus of claim 1 wherein the assembly is seatable on the ledge.

13. The apparatus of claim 1 wherein the ledge extends continuously along the base.

14. The apparatus of claim 1 wherein the ledge defines a supporting surface that is proximate to the base.

15. The apparatus of claim 1 wherein the ledge extends laterally from the base.

16. The apparatus of claim 1 wherein dimensions of the ledge are at least equal to dimensions of the assembly.

17. The apparatus of claim 1 wherein the assembly is supportable proximate to the base.

18. The apparatus of claim 2 wherein the base is separate from the connector.

19. The apparatus according to claim 1 in which the ledge includes an end region extending beyond a peripheral edge of the base also extending in the substantially horizontal direction.

20. The apparatus according to claim 2 further comprising a plurality of struts attached to the base for supporting the end region of the ledge.

21. The apparatus according to claim 3 in which the struts extend from the peripheral edge of the base to a position generally near an end of the ledge.

22. The apparatus according to claim 3 in which three struts are provided and the struts are aligned in spaced relation along a lower surface of the ledge.

23. The apparatus according to claim 3 in which the ledge defines a slot which communicates with the channel, for lowering the printed circuit board into the channel.

24. The apparatus according to claim 3 in which the base includes first and second arms positioned on opposite sides thereof, the first and second arms defining the channel.

25. The apparatus according to claim 24 in which the first and second arms each include a lip formed at all end of each of the first and second arms.

26. The apparatus according to claim 1 in which the connector is integrally formed with the base.

27. The apparatus according to claim 1 in which tile base includes interlock-ing structures for retaining the connector, the interlocking structures being adapted to be received by corresponding interlocking recesses on the connector.

28. The apparatus according to claim 1 in which the lower surface of the base is adapted to rest on a computer motherboard.

29. The apparatus according to claim 1 in which the width of the ledge is substantially equal to the width of the assembly.

30. The apparatus according to claim 1 in which the width of the ledge is greater than the width of the assembly.

31. In combination with a hard disk drive assembly including a printed circuit board and a head disk assembly coupled to the printed circuit board, an apparatus for supporting a device in a computer comprising:

a base having an electrical connector electrically connected to the printed circuit board; and a ledge extending from said base, wherein the head disk assembly is supported above the ledge.

32. The apparatus of claim 31 wherein said base defines a channel to fit the apparatus to said connector.

33. The apparatus of claim 31 wherein said ledge extends orthogonally from said base.

* * * * *